Dec. 11, 1962 W. E. RUDISCH Re. 25,299

CLUTCH

Original Filed Sept. 12, 1957

WITNESS:

Esther M. Stockton

INVENTOR.
Walter Ernst Rudisch

BY

John Philip Ryan

ATTORNEY

United States Patent Office

Re. 25,299
Reissued Dec. 11, 1962

25,299
CLUTCH

Walter Ernst Rudisch, Pine City, N.Y., assignor, by mesne assignments, to The Bendix Corporation, a corporation of Delaware Original No. 2,875,876, dated Mar. 3, 1959, Ser. No. 683,523, Sept. 12, 1957. Application for reissue Jan. 13, 1961, Ser. No. 83,607
11 Claims. (Cl. 192—84)

Matter enclosed in heavy brackets [ ] appears in the original patent but forms no part of this reissue specification; matter printed in italics indicates the additions made by reissue.

This invention relates to clutches and more particularly to an electromagnetic tooth or dog type clutch.

Tooth type clutches are extremely useful in situations where the clutch must transmit a very high torque with reference to the physical size or dimensions of the clutch. In such clutches the driving side contains a driving member having a great number of mating teeth, a large number of teeth being preferred so that contact between as many teeth as possible is obtained for purposes of strength. The axial height of the teeth is to be designed relatively small so that short travel and instantaneous engagement between the mating parts is obtainable. For example, the clutch may be engaged at relative speeds up to 300 to 500 r.p.m. with the joining speed approximating 1/20 of a second between the driving and driven components.

To achieve long operating life, it is important that the driving and driven parts of the clutch separate instantaneously and that the separation be maintained. Since, as stated, the length of travel of the disengaging member is extremely slight, in order that instantaneous separation can be accomplished, it is often the case that one member will accidentally move a sufficient distance to cause contact with the other member other than at the proper time. Such contact causes vibration and chattering, and materially reduces the smoothness of operation as well as the service life of the clutch. Furthermore, if means such as springs are relied upon to separate the driving and driven clutch parts and to maintain them separated, the springs themselves will frictionally engage the clutch part and introduce unwanted drag torque.

It is therefore a principal object of this invention to provide a tooth or dog type clutch which is electromagnetically operated and in which the driven and driving portions of the clutch are maintained wholly out of relative frictional contact when the clutch is disengaged.

Another object of this invention is to provide an electromagnetic clutch having a permanent magnet mounted therein to maintain the driven part in its furthermost position from the driving body when the operating electromagnet is deenergized.

A further object of this invention is to provide an electromagnetic clutch including driven and driving bodies in which a movable armature plate is mechanically separated from the driving body and magnetically secured to the driven body to maintain a separating gap between the driving and driven bodies when the clutch is deenergized.

Other objects and advantages of this invention will be apparent from the following description, the accompanying drawings and the appended claims.

Figure 1:
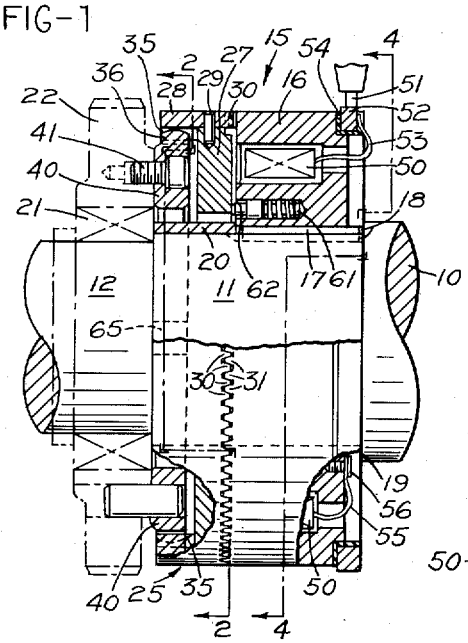
FIG. 1 is a side view partly in section and partly in elevation showing an electromagnetic clutch according to the present invention.

Referring to FIG. 1 of the drawings, which illustrate a preferred embodiment of the present invention, the drive shaft 10 extends from a suitable source of power. The shaft 10, which constitutes the driving member, has stepped portions 11 and 12 of reduced diameter to accommodate parts of the clutch 15. The first clutch body 16 is generally cylindrically shaped and has an inner diameter slightly larger than the exterior diameter of the first shaft portion 11 of reduced diameter, the clutch body 16 being secured to the shaft by means of a key 17, and the shoulder 19 formed by the change in shaft diameter forms one abutment limiting the axial movement of the first clutch body 16. On its other side, the body 16 is held in position by a spacer sleeve 20 which is in turn held in place by the inner race of the bearing 21 for the member to be driven by the clutch, which is shown as a gear 22.

The clutch body 16 cooperates with a composite second clutch body which is indicated generally at 25 and includes an annular plate 27 and a ring gear 28 attached to the outer periphery of plate 27 as by dowl pins 29. The ring gear 28 includes on its side adjacent the body 16 a plurality of axially extending clutch teeth 30 constructed to mesh with similarly projecting teeth 31 on the adjacent end surface of the clutch body 16. Both of these sets of teeth are of small axial extent so that movement of body 25 with respect to body 16 need not be very great to engage and disengage these members.

On its opposite side from the clutch body 16, the ring gear 28 includes integrally formed internal gear teeth 35 for mating in splined relation with teeth 36 on a connecting spline plate 40 of suitable non-magnetic material such as brass which is secured to the driven gear 22 as by bolts 41. The desired concentric mounting of plate 40 with respect to shaft 10 is readily obtained by forming the inner diameter of plate 40 to match the outer diameter of bearing 21, and the teeth 36 serve to support the clutch body 25 in similarly concentric relation with shaft 10. At the same time, the body 25 can move axially with respect to plate 40 along the splined connection formed by the teeth 35—36, and the teeth 36 are shown as crowned axially to minimize possible binding with teeth 35 in the event of cocking of plate 27 during such movement.

The application of clutches to machine tools like milling machines, grinders, and so forth often requires that the clutch be remotely controlled, due to inaccessibility for manual operation. The present clutch is provided with electromagnetic means to effect relative axial movement between the first and second clutch bodies 16 and 25 to engage teeth 30 and 31. Body 16 has its inner face recessed to receive a magnetic coil 50 which creates an electromagnetic field upon the application of direct current thereto. Application of current to coil 50 can be effected through brush 51, slip ring 52 and electrical conductor 53, the slip ring 52 being set on an insulator 54 fitted into L-shaped recess in body 16, and the other end of coil 50 is grounded to body 16 by means of ground wire 55 and screw 56. Thus upon application of current to coil 50, a field is created causing the magnetic flux lines to draw the second clutch body 25 toward the first clutch body 16 and interengage teeth 30 and 31 forming a driving connection between the two bodies. The member 27 serves as an armature plate for the electromagnet, and the radially extending teeth 35 of ring gear 28 permit free axial movement of second body 25 with respect to spline plate 40 while still maintaining rotary driving of gear 22 by the first and second bodies through teeth 36.

In view of the fact that rapid engagement and disengagement is required between teeth 30 and 31 to prevent chattering and unnecessary wear, the first body 16 and second body 25 are advantageously positioned with relatively slight clearance between the teeth, even when wholly disengaged. It is therefore important that immediate separation of the members occur and that such separation be maintained to prevent accidental contact between the teeth. To separate the bodies upon deenergization of coil 50 with consequent collapse of the magnetic field, biasing means is located within body 16. The biasing means may assume various forms but is here shown as comprising plungers 60, which are urged normally outwardly by coil springs 61, the springs being compressed by movement of the second body 25 toward first body 16 under the influence of the magnetic field. Three or more such spring biased plungers 60 are preferably located at equal angular intervals in the face of body 16, and each plunger is retained in body 16, as by peening at 62, to leave each plunger with a projecting portion a few thousandths of an inch longer than the axial dimension of teeth 30 in order to assure prompt disengagement of the teeth when the coil 50 is deenergized.

Figure 3:
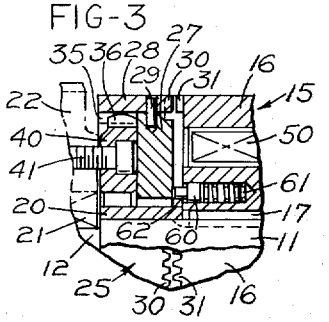
FIG. 3 is a somewhat enlarged fragmentary view showing the operating components of the clutch.
Figure 4:
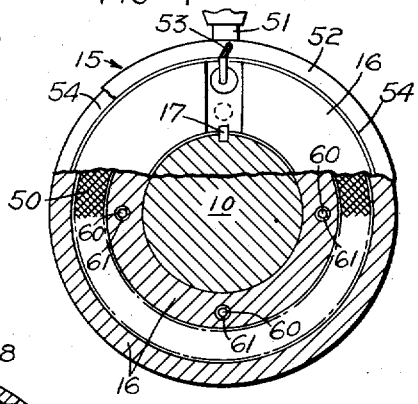
FIG. 4 is a sectional view taken substantially along the line 4—4 of FIG. 1.
Figure 2:
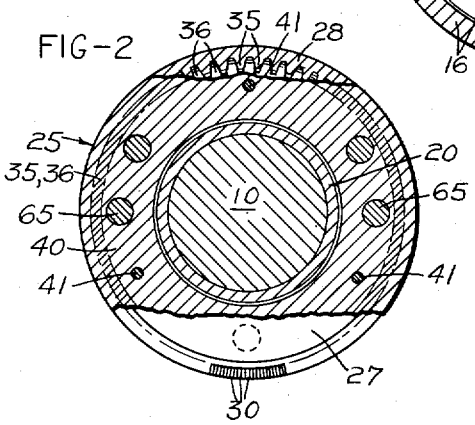
FIG. 2 is a sectional view taken substantially along the line 2—2 of FIG. 1.

Because of the relatively small gap existing between teeth 30 and 31 during periods of disengagement (see FIG. 3), the invention provides keeper means for positively retaining second body 25 in its withdrawn position to preclude accidental contact of the teeth. Such keeper means are shown as comprising a plurality of permanent magnets 65 which are mounted *by means of a press fit or other suitable known fastening means* within spline plate 40 to aid in withdrawing the second body from contact with the first body and also to assist in moving the body beyond the outward limit of the spring biased plungers 60. The magnetic pull exerted against the second body by the permanent magnets 65 is slight compared to the electromagnetic force created by the magnet coil 50 so that the retaining or keeping powers of the permanent magnets can be overridden by the flux created by the electromagnet. For example, in a clutch wherein the overall diameter is of the order of 3½ inches, satisfactory results have been obtained utilizing two Alnico magnets each ¼ inch in diameter and ¼ inch in thickness.

In the use of this clutch, when it is installed in a gear box or other location of use, the positions of the several parts are established on the shaft 10 in such relation that the spacing between the adjacent faces of the armature plate 27 and spline plate 40 in the engaged condition of the clutch is greater than the axial dimension of the teeth 30 and 31. This condition is readily established in accordance with conventional practice by the position of the driven member 22 with respect to the driving clutch part 16. Then in operation, whenever the coil 50 is energized, the armature plate 27 will move toward the part 16 into the position of engagement of the teeth 30 and 31, as shown in FIG. 1. When the coil 50 is deenergized the springs 61 will immediately cause the plungers 60 to push the armature plate 27 to a position of disengagement of the teeth 30 and 31, and this movement of the plate 27 will bring it within the effective range of the magnets 65, which will draw and hold the plate 27 in contact with plate 40 and thus fully out of engagement with the plungers 60. The clutch may be reengaged at any time by again energizing coil 50, since the magnetic force developed thereby is more than sufficient to overcome the attraction of magnets 65 for armature plate 27 and therefore to move plate 27 back to the engaged position of the teeth 30 and 31.

*Generally, it is desirable to reduce the inertia of the driven elements of the clutch and for that reason the preferred embodiment has been illustrated and described as having the magnetic coil 50 positioned in the first or driven clutch body 16. It will be readily apparent to those skilled in this art that where overcoming starting inertia poses no problem then the device may be constructed with the magnetic coil being positioned in the driven clutch body. The preferred embodiment is also illustrated and described as having the axially movable clutch body supported by the driving member. Again, it will be readily apparent that in some instances it may be desirable to support the movable clutch body on the driven member. Necessary relocations of complementing structures then must be made to accommodate the reversal of the coil or the movable clutch body. Such modifications or structural changes are fully intended to come within the teachings or suggestions herein made.*

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. An electromagnetic clutch for positively joining a driving member to a driven member comprising a first clutch body adapted to be connected to the driving member, a second clutch body, a support *adapted to be connected to the driven member* for securing said second clutch body to the driven member for rotating movement therewith and including means providing for axial movement of said second *clutch* body thereon toward said first *clutch* body, means carried by *one of* said [first] clutch [body] *bodies* for generating an electromagnetic field to move said second *clutch* body toward said first *clutch* body, means on each of said first and second *clutch* bodies for effecting a positive driving connection between said *clutch* bodies when said electromagnetic means is energized, *means carried by said first clutch body having limited axial contact with said second clutch body for effecting initial axial separation of said clutch bodies upon de-energization of said electromagnetic means,* and permanent magnet keeper means carried by said support *adapted to be effective after said limited contact between said second clutch body and said means for initiating separation of said clutch bodies has substantially ceased* for holding said second clutch body in spaced relation with said first clutch body preventing accidental contact therebetween when said electromagnetic means is deenergized.

2. An electromagnetic clutch for positively joining a driving member to a driven member comprising a first clutch body having a plurality of axially extending teeth on one side thereof adapted to be connected to the driving member, a second clutch body having a plurality of axially extending teeth adapted for engagement with said teeth on said first *clutch* body [member], a support *adapted to be connected to the driven member* for securing said second clutch body to the driven member and including means providing for axial movement of said second clutch body thereon with respect to said first clutch body, a coil mounted on *one of* said [first body] *clutch bodies* to create an electromagnetic field causing axial movement of said second *clutch body* [member] toward said first *clutch body* [member] to engage said teeth and form a driving connection between said first and second *clutch* bodies, *resiliently yieldable means carried by said first clutch body having limited axial contact with said second clutch body for effecting initial axial separation of said clutch body upon de-energization of said electromagnetic means* and permanent magnet keeper means carried by said support *adapted to be effective after said limited contact between said second clutch body and said means for initiating separation of said clutch bodies has substantially ceased* for holding said second clutch body axially with said teeth thereon out of driving engagement with said first clutch body to prevent accidental contact therebetween when said electromagnetic means is deenergized.

3. An electromagnetic clutch for positively joining a driving member to a driven member comprising a first clutch body including a coil for creating an electromagnetic field, *said first clutch body* adapted to be joined to the driving member, a plurality of axially extending teeth on one side of said first clutch body, a second clutch body having a plurality of axially extending teeth adapted for engagement with said teeth on said first clutch body, a support *adapted to be connected to the driven member* for securing said second clutch body to the driven member and including means providing for axial movement of said second clutch body thereon toward said first *clutch* body upon energizing of said electromagnetic means, means including an axially movable plunger and a spring carried by one of said clutch bodies for effecting initial axial separation of said *clutch* bodies upon deenergizing of said electromagnetic means, magnetic keeper means carried by said support for holding said first and second clutch bodies in spaced relation preventing accidental contact therebetween when said electromagnetic means is deenergized, and means limiting the extent of projection of said plunger from said one clutch body to prevent contact thereof with the other of said *clutch* bodies while the said second clutch body is held by said keeper means.

4. An electromagnetic clutch for positively joining a driving member to a driven member comprising a first clutch body including a coil for creating an electromagnetic field, *said first clutch body* adapted to be joined to the driving member, a plurality of axially extending teeth on one side of said first clutch body, a second clutch body having a plurality of axially extending teeth adapted for engagement with said teeth on said first clutch body, a support *adapted to be connected to the driven member* for securing said second clutch body to the driven member and providing for axial movement of said second clutch body thereon toward said first *clutch* body upon energizing of said electromagnetic means, a spring and plunger mounted in said first clutch body to force said second clutch body wholly out of engagement therewith when said electromagnetic means is deenergized, said spring being compressed by movement of said second *clutch* body toward said first *clutch* body, permanent magnet keeper means carried by said support for holding said second *clutch* body in spaced relation with said first *clutch* body when said electromagnetic means is deenergized, and means limiting the extent of projection of said plunger from said first clutch body to prevent contact thereof with said second clutch body while the latter is held by said keeper means.

5. An electromagnetic clutch for positively joining a rotating driving member to a driven member to be rotated comprising a first clutch body adapted to be joined to the driving member, a coil carried by said first *cluch* body for creating an electromagnetic field, a plurality of axially extending teeth on one side of said first *clutch* body, a second clutch body including a ring gear secured to the outer periphery thereof, said ring gear having axially extending teeth on one end adapted for engagement with said teeth on said first clutch body and having radially extending teeth on the opposite end thereof, a connecting plate for attachment to the driven member including teeth engaging said radially extending teeth on said ring gear in splined relation to form a positive torque transmitting connection providing for relative axial movement between said ring gear and said plate, a spring and plunger mounted in said first clutch body to force said second clutch body wholly out of engagement therewith when said electromagnetic means is deenergized, permanent magnet keeper means carried by said connecting plate to hold second *clutch* body in spaced relation with said first *clutch* body when said electromagnetic means is deenergized, and means limiting the extent of projection of said plunger from said first clutch body to prevent contact thereof with said second clutch body while the latter is held by said keeper means.

*6. An electromagnetic clutch for positively joining a driving member to a driven member comprising a first clutch body adapted to be connected to one of said members, a second clutch body, a support adapted to be connected to the other of said members for securing said second clutch body to said other member for rotating movement therewith and including means providing for axial movement of said second clutch body thereon toward said first clutch body, means carried by one of said clutch bodies for generating an electromagnetic field to move said second clutch body toward said first clutch body, means on each of said first and second clutch bodies for effecting a positive driving connection between said clutch bodies when said electromagnetic means is energized, means carried by said first clutch body having limited axial contact with said second clutch body for effecting initial axial separation of said clutch bodies upon deenergization of said electromagnetic means, and permanent magnet keeper means carried by said support adapted to be effective after said limited contact between said second clutch body and said means for initiating separation of said clutch bodies has substantially ceased for holding said first and second clutch bodies in spaced relation preventing accidental contact therebetween when said electromagnetic means is deenergized.*

*7. An electromagnetic clutch for positively joining a driving member to a driven member comprising a first clutch body having a plurality of axially extending teeth on one side thereof, a second clutch body having a plurality of axially extending teeth adapted for engagement with said teeth on said first clutch body, a support adapted to be connected to one of said members for securing one of the clutch bodies to said one member and including means providing for axial movement of said one clutch body thereon with respect to the other clutch body, means connecting said other clutch body to the other of said members, a coil mounted on one of the clutch bodies to create an electromagnetic field causing axial movement of said one clutch body supported for axial movement toward said other clutch body to engage said teeth and form a driving connection between said clutch bodies, resiliently yieldable means carried by said first clutch body having limited axial contact with said second clutch body for effecting initial axial separation of said clutch body upon deenergization of said electromagnetic means and permanent magnet keeper means carried by said support adapted to be effective after said limited contact between said second clutch body and said means for initiating separation of said clutch bodies has substantially ceased for holding said one clutch body supported for axial movement axially with said teeth thereon out of driving engagement with the teeth on said other clutch body to prevent accidental contact therebetween when said electromagnetic means is deenergized.*

*8. An electromagnetic clutch for positively joining a driving member to a driven member comprising a first clutch body including a coil for creating an electromagnetic field, said first clutch body adapted to be joined to one of the members, a plurality of axially extending teeth on one side of said first clutch body, a second clutch body having a plurality of axially extending teeth adapted for engagement with said teeth on said first clutch body, a support adapted to be connected to the other of said members for securing said second clutch body to said other member and including means providing for axial movement of said second clutch body thereon toward said first clutch body upon energizing said electromagnetic means, means including an axially movable plunger and a spring carried by one of said clutch bodies for effecting initial axial separation of said clutch bodies upon deenergizing said electromagnetic means, magnetic keeper means carried by said support for holding said first and said second clutch bodies in*

*spaced relation preventing accidental contact therebetween when said electromagnetic means is deenergized and means limiting the extension of projection of said plunger from said one clutch body to prevent contact thereof with the other of said clutch bodies while said second clutch body is held by said keeper means.*

*9. An electromagnetic clutch for positively joining a driving member to a driven member comprising a first clutch body including a coil for creating an electromagnetic field, said first clutch body adapted to be joined to one of the members, a plurality of axially extending teeth on one side of said first clutch body, a second clutch body having a plurality of axially extending teeth adapted for engagement with said teeth on said first clutch body, a support adapted to be joined to the other of said members for securing said second clutch body to said other member and including means providing for axial movement of said second clutch body thereon toward said first clutch body upon energizing said electromagnetic means, a spring plunger mounted in said first clutch body to force said second clutch body wholly out of engagement therewith when said electromagnetic means is deenergized, said spring being compressed by movement of said second clutch body toward said first clutch body permanent magnet keeper means carried by said support for holding said second clutch body in spaced relation with said first clutch body when said electromagnetic means is deenergized and means limiting the extent of projection of said plunger from said first clutch body to prevent contact thereof with said second clutch body while the latter is held by said keeper means.*

*10. An electromagnetic clutch for positively joining a rotating driving member to a driven member to be rotated comprising a first clutch body adapted to be joined to one of said members, a coil carried by said first clutch body for creating an electromagnteic field, a plurality of axially extending teeth on one side of said first clutch body, a second clutch body including a ring gear secured to the outer periphery thereof, said ring gear having axially extending teeth on one end adapted for engagement with said teeth on said first clutch body and having radially extending teeth on the opposite end thereof, a connecting plate for attachment to said other member including teeth engaging said radially extending teeth on said ring gear in splined relation to form a positive torque transmitting connection providing for relative axial movement between said ring gear and said plate, a spring and plunger mounted in said first clutch body to force said second clutch body wholly out of engagement therewith when the electromagnetic means is deenergized, permanent magnet keeper means carried by said connecting plate to hold said second clutch body in spaced relation with said first clutch body when said electromagnetic means is deenergized, and means for limiting extension of projection of said plunger from said first clutch body to prevent contact thereof with said second clutch body while the latter is held by said keeper means.*

*11. An electromagnetic clutch for positively joining a rotating driving member to a driven member to be rotated comprising a first clutch body adapted to be joined to one of said members, a plurality of axially extending teeth on one side of said first clutch body, a second clutch body including a ring gear secured to the outer periphery thereof said ring gear having axially extending teeth on one end adapted for engagement with said teeth on said first clutch body and having radially extending teeth on the opposite end thereof, a coil carried by one of said clutch bodies for creating an electromagnetic field, a connecting plate for attachment to said other member including teeth engaging said radially extending teeth on said ring gear in splined relation to form a positive torque transmitting connection providing for relative axial movement between said ring gear and said plate, a spring and plunger mounted in said first clutch body to force said second clutch body wholly out of engagement therewith when said electromagnetic means is deenergized, permanent magnet keeper means carried by said connecting plate to hold said second clutch body in spaced relation with said first clutch body when said electromagnetic means is deenergized, and means limiting the extension of projection of said plunger from said first clutch body to prevent contact thereof with said second clutch body while the latter is held by said keeper means.*

References Cited in the file of this patent or the original patent

UNITED STATES PATENTS

| | | |
|---|---|---|
| 845,731 | Eskilsson | Feb. 26, 1907 |
| 1,286,717 | Morrison | Dec. 3, 1918 |
| 1,446,225 | Thompson | Feb. 20, 1923 |
| 1,470,961 | Creveling | Oct. 16, 1923 |
| 2,055,723 | Hope | Sept. 29, 1936 |
| 2,612,248 | Feiertag | Sept. 30, 1952 |
| 2,962,142 | Straub | Nov. 29, 1960 |
| 2,969,134 | Wieldmann et al. | Jan. 24, 1961 |

FOREIGN PATENTS

| | | |
|---|---|---|
| 67,013 | Austria | Nov. 10, 1914 |
| 1,075,903 | Germany | Feb. 19, 1960 |